(12) United States Patent
Yang et al.

(10) Patent No.: US 11,524,254 B2
(45) Date of Patent: Dec. 13, 2022

(54) AIR FILTERING SYSTEM

(71) Applicant: Shenzhen Chenbei Technology Co., Ltd., Shenzhen (CN)

(72) Inventors: Lin Yang, Shenzhen (CN); Hai Yang, Shenzhen (CN)

(*) Notice: Subject to any disclaimer, the term of this patent is extended or adjusted under 35 U.S.C. 154(b) by 330 days.

(21) Appl. No.: 16/714,471

(22) Filed: Dec. 13, 2019

(65) Prior Publication Data

US 2020/0188827 A1   Jun. 18, 2020

(30) Foreign Application Priority Data

Dec. 13, 2018 (CN) .......................... 201811525254.X

(51) Int. Cl.
| | |
|---|---|
| *B01D 46/00* | (2022.01) |
| *B01D 46/24* | (2006.01) |
| *B01D 46/64* | (2022.01) |
| *F24F 8/10* | (2021.01) |
| *F24F 13/20* | (2006.01) |
| *B01D 53/04* | (2006.01) |

(52) U.S. Cl.
CPC ..... *B01D 46/0005* (2013.01); *B01D 46/0036* (2013.01); *B01D 46/64* (2022.01); *B01D 53/04* (2013.01); *F24F 8/10* (2021.01); *B01D 2253/102* (2013.01); *B01D 2259/4508* (2013.01); *B01D 2265/029* (2013.01); *B01D 2279/50* (2013.01)

(58) Field of Classification Search
CPC ....................... B01D 46/0005; B01D 46/0013; B01D 46/60; B01D 46/62; B01D 46/64; B01D 46/88; B01D 46/521; B01D 46/2407; B01D 2265/028; B01D 2265/029
USPC .................. 55/490, 496, 498, 501, 510, 511
See application file for complete search history.

(56) References Cited

U.S. PATENT DOCUMENTS

| | | | |
|---|---|---|---|
| 5,800,581 A * | 9/1998 | Gielink .................. | B01D 46/88 55/498 |
| 2010/0071322 A1* | 3/2010 | Clements ........... | B01D 46/2407 55/341.5 |
| 2010/0101195 A1* | 4/2010 | Clements ............. | B01D 46/521 55/341.5 |
| 2012/0131892 A1* | 5/2012 | Cheng .................... | B01D 46/62 55/476 |
| 2014/0020561 A1* | 1/2014 | Aery ...................... | B01D 46/60 55/467 |
| 2015/0204282 A1* | 7/2015 | Merritt ............. | F02M 35/02483 55/482 |

\* cited by examiner

*Primary Examiner* — Minh Chau T Pham
(74) *Attorney, Agent, or Firm* — Tsz Lung Yeung

(57) ABSTRACT

An air filtering system includes a main system and a filtering module. The main system includes a main body having an air inlet, an air flow cover having an air outlet, and a primary filtering core replaceably disposed in the main body, wherein the air flow cover is detachably coupled at the main body to form a basic air filtering mode for filtering air from the air inlet to the air outlet through the primary filtering core. The filtering module is detachably coupled between the main body and the air flow cover to form an advanced air filtering mode, wherein the filtering module includes a secondary filtering core arranged for filtering the air after passing through the primary filtering core and before existing the air outlet.

17 Claims, 7 Drawing Sheets

AIR FILTERING SYSTEM

BACKGROUND OF THE PRESENT INVENTION

Field of Invention

The present invention relates to an air circulating system, and more particularly to an air filtering system, which comprises a filtering module which can be selectively added to a main system to provide an additional air treatment.

Description of Related Arts

An air filter is a device for trapping or removing particles or contaminants from the air. Specifically, the air filter is an air cleaning device able to absorb, decompose, or convert various air pollutants (such as PM2.5, dust, pollen, odor, formaldehyde and other decoration pollution, bacteria, allergens, etc.) to effectively improve an air quality. Accordingly, the air filter is mainly categorized into a residential air filtration system, a commercial air filtration system, an industrial air filtration system, and a building air filtration system.

An activated carbon filter must be replaced regularly for the conventional air filtration systems especially under a heavy formaldehyde environment. Otherwise, harmful gases absorbed by the activated carbon filter will volatilize and cause additional or secondary pollution. However, since the activated carbon filter is relatively expensive and its service life span is relatively short, most activated carbon filters will not be replaced at a scheduled or desirable time.

SUMMARY OF THE PRESENT INVENTION

Certain variations of the present invention provide an air filtering system which is able to solve the technical problems of high material cost and short service life span of an activated carbon filter comparing with the conventional air filter.

Certain variations of the present invention provide an air filtering system which comprises one or more filtering modules as an add-on filtering component selectively coupled between a main body and an air flow cover, such that the user is able to add-on different filtering functions to the air filtering system.

Certain variations of the present invention provide an air filtering system, wherein the assembly operation of the filtering module is easy and simple by rotatably engaging the filtering module with the main body and the air flow cover.

Certain variations of the present invention provide an air filtering system, wherein the air flow within the air filtering system is smooth for being filtered twice to significantly improve the air quality by the air filtering system of the present invention.

Certain variations of the present invention provide an air filtering system, wherein the structural configuration among the filtering module, the main body and the air flow cover is very simple so as to enhance the manufacturing process of the present invention.

In one aspect of the present invention, it provides an air filtering system, comprising:

a main system which comprises a main body having an air inlet, an air flow cover having an air outlet, and a primary filtering core replaceably disposed in the main body, wherein the air flow cover is detachably coupled at the main body to form a basic air filtering mode for filtering air from the air inlet to the air outlet through the primary filtering core; and at least a filtering module detachably coupled between the main body and the air flow cover to form an advanced air filtering mode, wherein the filtering module comprises a secondary filtering core arranged for filtering the air after passing through the primary filtering core and before existing the air outlet.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIG. 1 to FIG. 7 of the drawings, an air filtering system according to a preferred embodiment of the present invention is illustrated. Broadly, the air filtering system 100 may comprise a main system and a filtering module 1.

Figure 1:
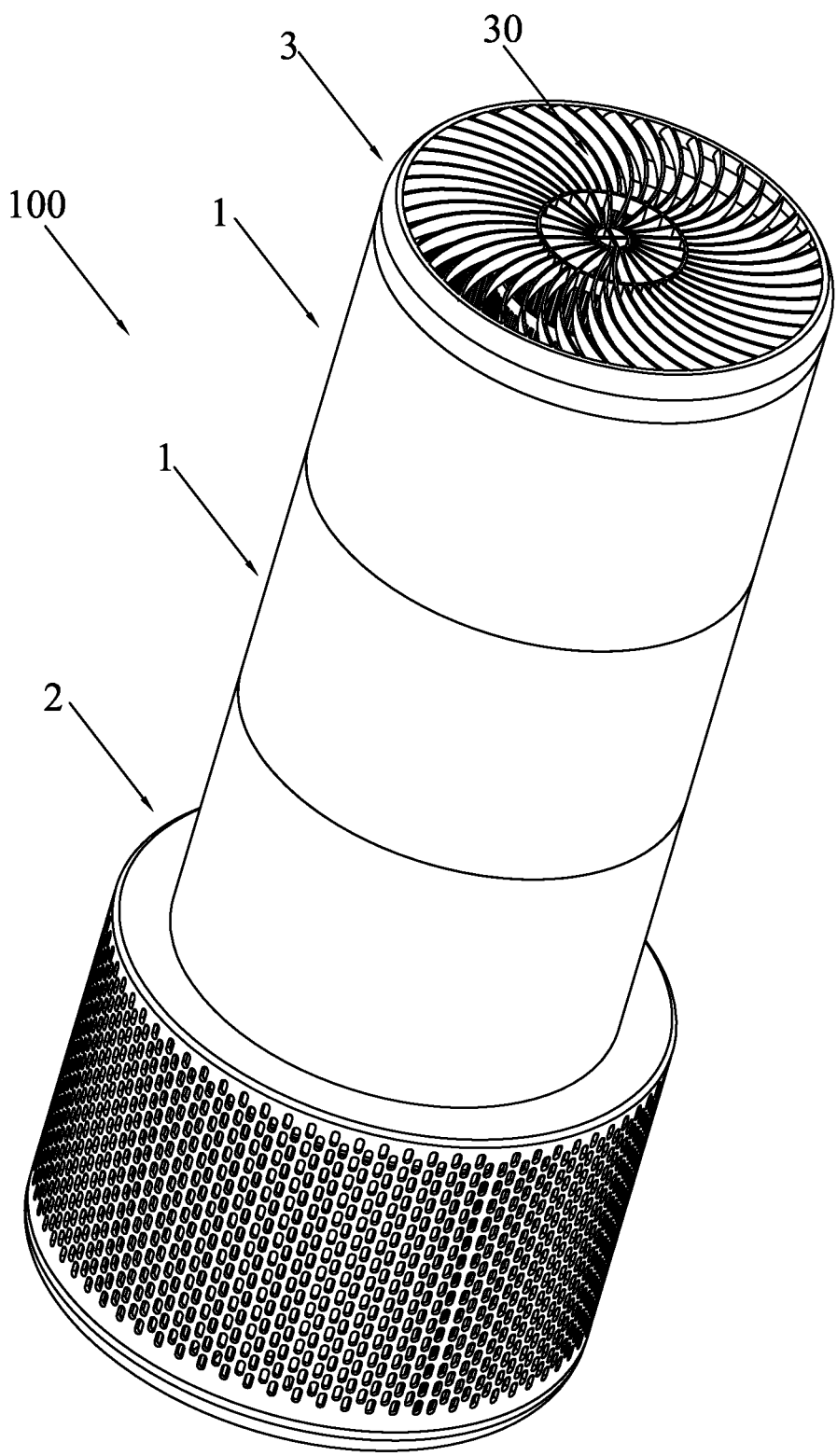
FIG. 1 is a perspective view of an air filtering system according to a preferred embodiment of the present invention.
Figure 2:
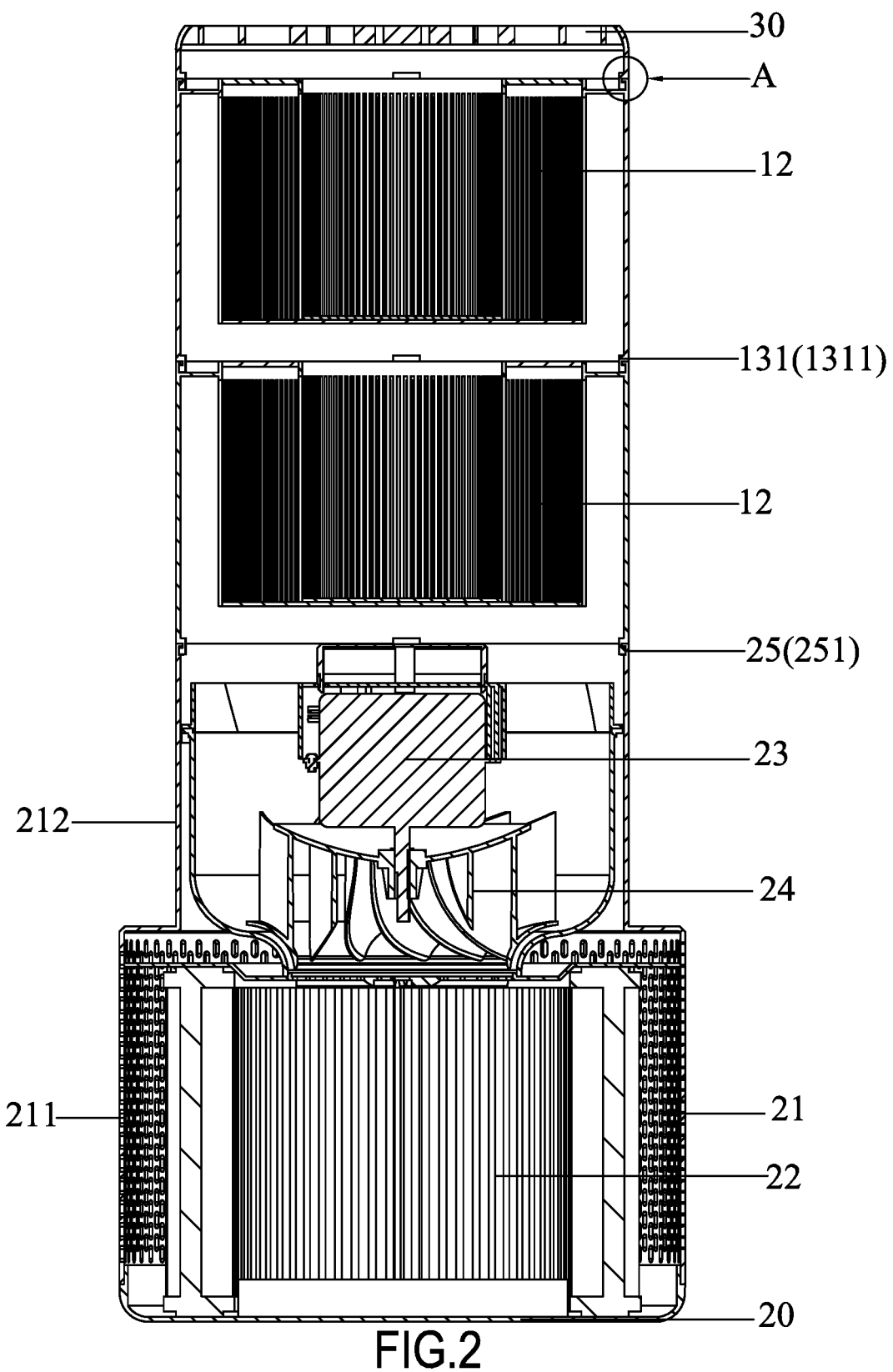
FIG. 2 is a sectional view of the air filtering system according to the preferred embodiment of the present invention.

As shown in FIG. 1 and FIG. 2 of the drawings, an air filtering system 100 according to a preferred embodiment of the present invention is illustrated, wherein the air filtering system 100 of the present invention may comprise a main body 2, an air flow cover 3, and a filtering module 1, wherein the main body 2 and the air cover 3 may detachably couple with each other to form a main system. The filtering module 1 may be selectively coupled to the main system for providing additional air treatment.

Specifically, the main body 2 may comprise an air inlet 20. The main system may further comprise a primary filtering core 22 replaceably disposed in an interior of the main body 2. The main body 2 may further comprise an outer casing 21 having a stepped sectional configuration and defining a cavity within the outer casing 21. As shown in FIG. 2 of the drawings, the outer casing 21 may have a bottom casing portion 211 and an upper casing portion 212 coaxially extended from the bottom casing portion, wherein a diameter of the bottom casing portion 211 may be larger than a diameter of the upper casing portion 212. The air inlet 20 may be provided at a bottom of the outer casing 21 to communicate with the cavity, wherein the filtering core 22 may be disposed in the cavity of the outer casing 21.

The air inlet 20 may be formed at a bottom of the bottom casing portion 211 of the outer casing 21. The air flow cover 3 may have an air outlet 30. The filtering module 1 may be detachably coupled between the main body 2 and the air flow cover 3. Particularly, the filtering module 1 may be coupled between the upper casing portion 212 of the outer casing 21 and the air flow cover 3. The filtering module 1 may comprise a secondary filtering core 12. In this preferred embodiment, the primary filtering core 22 may be different from the secondary filtering core 12, wherein the primary filtering core 22 and the secondary filtering core 12 may provide different air purification functions and performance. For example, the primary filtering core 22 may be arranged for providing a basic air purification function and the secondary filtering core 12 may be configured as a special filter for improving ambient air quality and increasing humidity. The primary filtering core 22 may be configured from or made of fibrous or porous materials for removing dust, pollen, and mold, etc. when air passes through the primary filtering core 22. The secondary filtering core 22 may be an activated carbon filter to filter gases and to combat volatile organic compounds when the air passes through the secondary filtering core 22. In other words, the air filtering system 100 of the present invention may form a basic air filtering mode and an advanced air filtering mode. The air flow cover 3 may be detachably and directly coupled at the main body 2 to form the basic air filtering mode for filtering air from the air inlet 20 to the air outlet 30 through the primary filtering core 22. On the other hand, the filtering module 1 may be detachably coupled between the main body 2 and the air flow cover 3 to form the advanced air filtering mode, such that the air is filtered by the secondary filtering core 12 after passing through the primary filtering core 22 and before existing the air outlet 30.

Furthermore, as shown in FIG. 2 of the drawings, the main body 2 may further comprises a motor 23, such as an electric motor, disposed in the cavity of the outer casing 21, and a fan impeller 24 powered by the motor 23. The motor 23 may have an output shaft connected to the fan impeller 24, such that the motor 23 may be arranged to generate a rotational power to drive the fan impeller 24 to rotate. The first primary filtering core 22 may be coaxially disposed in the bottom casing portion 211 of the outer casing 21. The fan impeller 24 and the motor 23 may be coaxially disposed in the upper casing portion 212 of the outer casing 21. The fan impeller 24 may be located between the motor 23 and the primary filtering core 22. The air inlet 20, the primary filtering core 22, the fan impeller 24, the motor 23, the secondary filtering core 12 and the air outlet 30 may be sequentially arranged from bottom to top with respect to the outer casing 21.

Comparing to the conventional air filter, the air filtering system 100 of the present invention may be constructed to have the main body 2, the air flow cover 3, and the filtering module 1, wherein the filtering module 1 may be detachably coupled between the main body 2 and the air flow cover 3. Specifically, the main body 2 may be incorporated with the primary filtering core 22 for air filtration, and the filtering module 1 may be incorporated with the secondary filtering core 12. Therefore, a user may be able to add the filtering module 1 to the air filtering system 100 as an add-on component to further improve the air quality and increase humidity. However, more than one filtering module 1 may be coaxially stacked together edge-to-edge between the main body 2 and the air flow cover 3 to enhance the air purification ability. In one example, under a normal dusty environment, the air flow cover 3 may be detachably coupled to the main body 2, wherein the filtering module 1 is not coupled thereto.

Therefore, during the operation of the air filtering system 100, the motor 23 may be actuated to drive the fan impeller 24 for sucking an ambient air into the cavity of the outer casing 21 through the air inlet 20, such that the air is guided to pass through the primary filtering core 22 before exiting at the air outlet 30. It will be cost saving because no activated carbon filter, i.e. the primary filtering core 22, needs to be used. If necessary, the filtering module 1 may be added and coupled between the main body 2 and the air flow cover 3, such that the air may be guided to sequentially pass through the primary filtering core 22 and the secondary filtering core 12 before exiting the air outlet 30. In other words, when organic gases and/or volatile organic compounds in the air needs to be filtered, the user may be able to add one or more filtering modules 1 into the air filtering system 100 for providing multiple filtering functions. Further, when the ambient air is relatively dry, the filtering module 1 as a humidified air filter may be added into the air filtering system 100.

In one example, the primary filtering core 22 may be configured as a HEPA filter which is one of the most common filtering elements used in the existing air filter. However, the HEPA filter cannot filter harmful gases. In another example, the secondary filtering core 12 may be configured as an air purification filter or a humidified air filter.

In one example, the secondary filtering core 12 may be configured as a humidified air filter for humidifying air when the air passes therethrough, wherein the secondary filtering core 12 may be constructed to have a water tank, a water absorbent, and a water tank cover. The water tank may be connected to the main body 2. The water tank cover may be connected to the air flow cover 2. The water absorbent may be disposed at the water tank and may be located between the air inlet 21 and the air outlet 30. The water absorbent, which may be made of cotton or other porous materials for absorbing water in the water tank, wherein the air may be guided to pass through the water absorbent for humidifying air.

In yet another example, the water absorbent may be replaced by an ultrasonic atomizer, wherein the air may be humidified by ultrasonic atomization.

When the secondary filtering core 12 is a gas filter for further purifying the air, the secondary filtering core 12 may be made of activated carbon filter to combine with a HEPA filter. When the air quality is good and the cost is limited, one single filtering module 1 may be used. When the air quality needs to be significantly improved, activated carbon filter may be selected as the secondary filtering core 12. When the air quality become worse, the combination of activated carbon filter and the HEPA filter may be used as the secondary filtering core 12. It is worth mentioning that two or more filtering modules 1 may be stacked together and between the main body 2 and the air flow cover 3 to prevent any material waste and to achieve the best air improvement.

Figure 4:
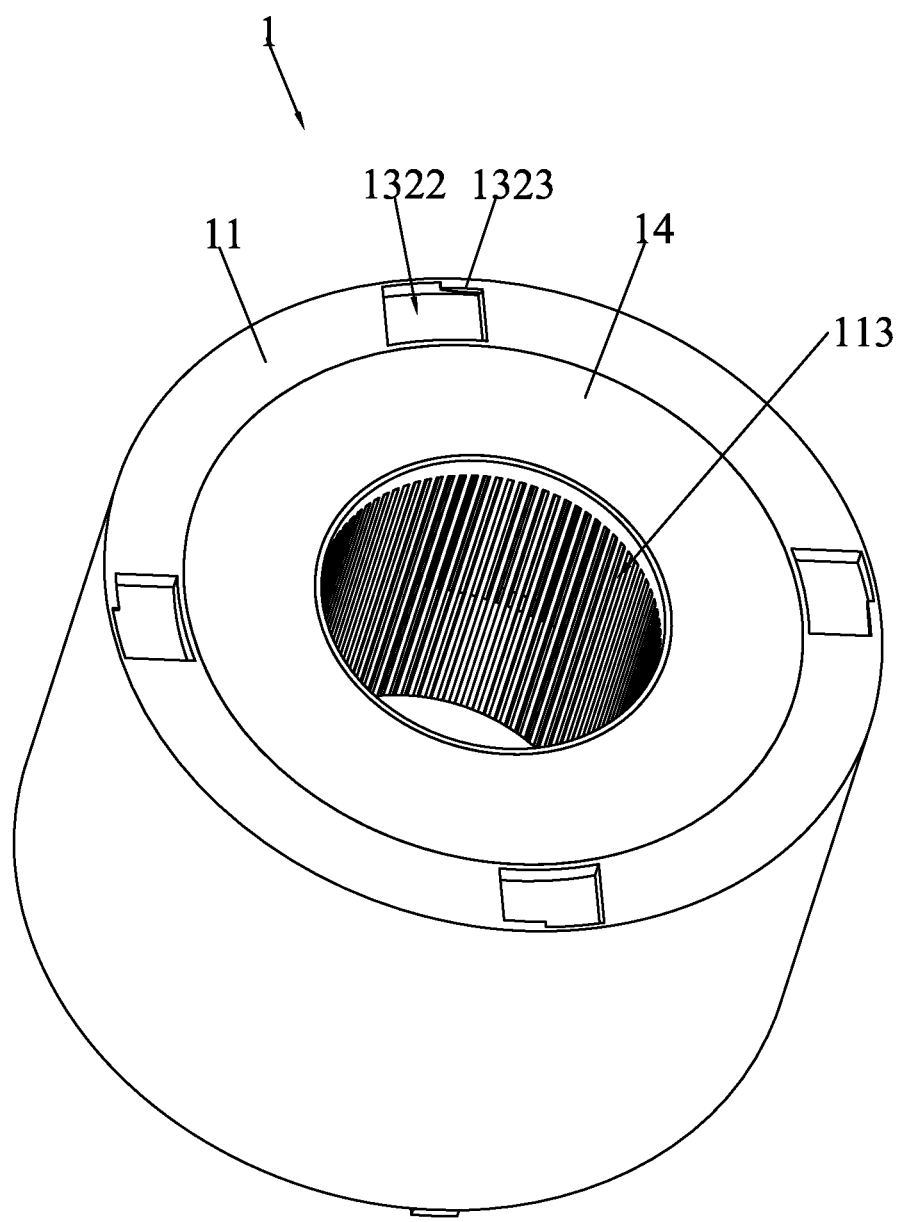
FIG. 4 is a perspective view of a filtering module of the air filtering system according to the preferred embodiment of the present invention.
Figure 5:
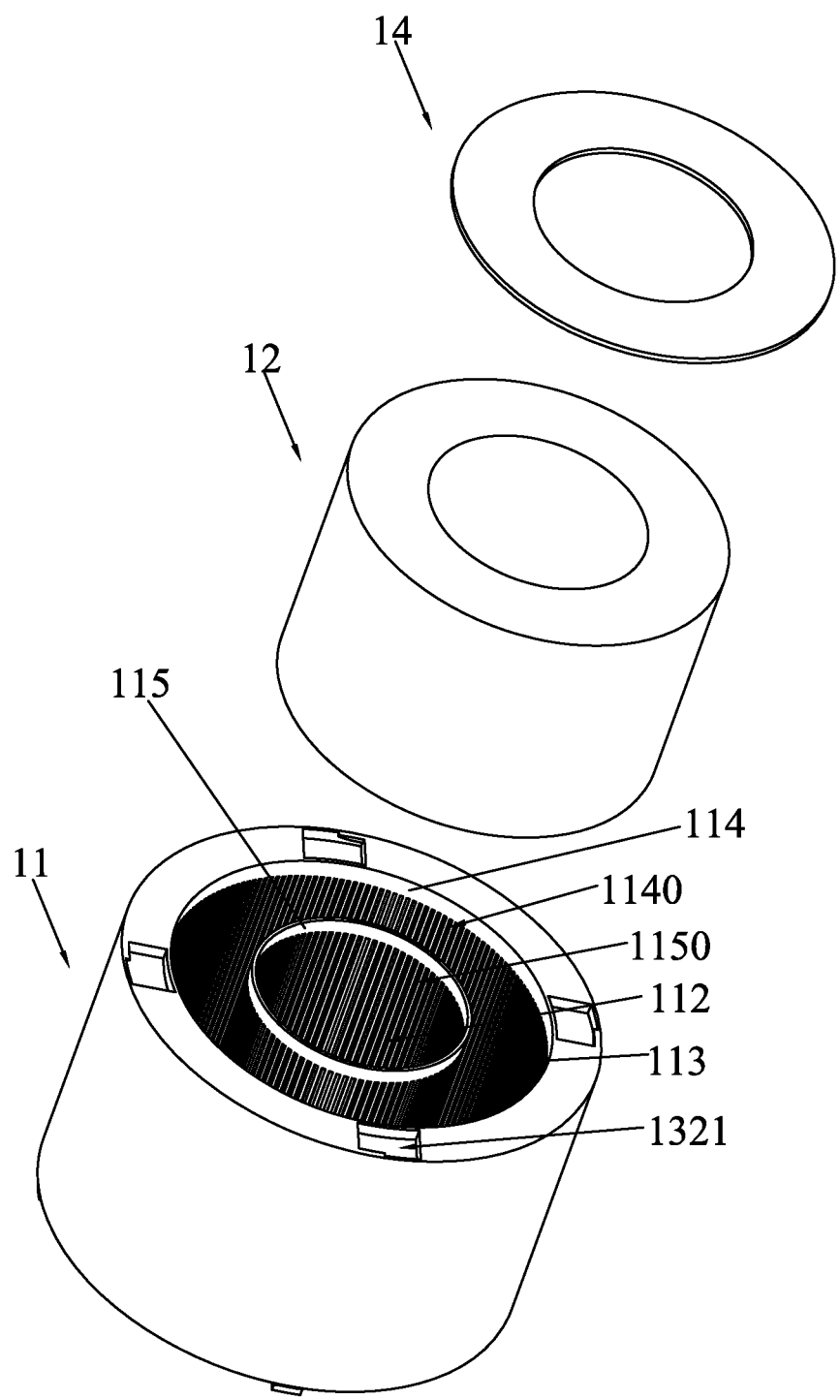
FIG. 5 is an exploded perspective view of the filtering module of the air filtering system according to the preferred embodiment of the present invention.
Figure 6:
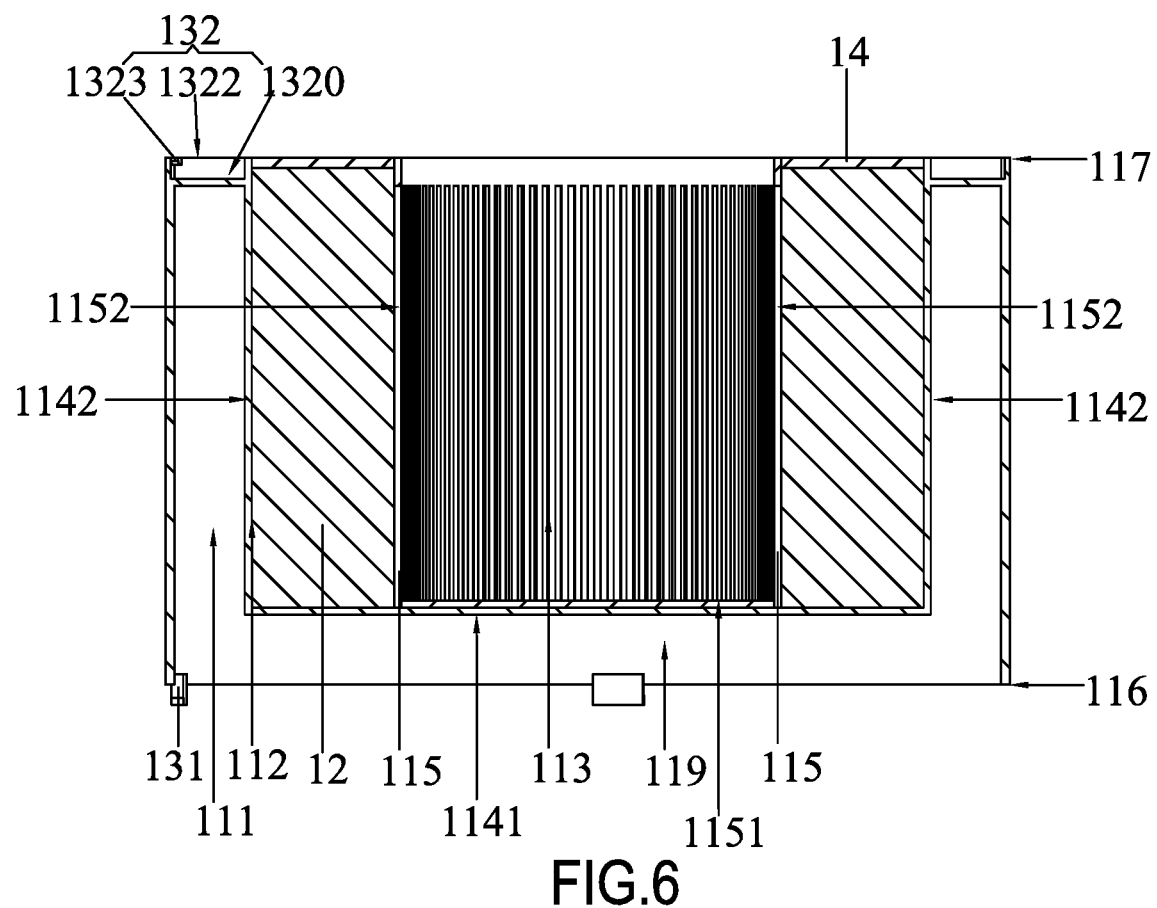
FIG. 6 is a sectional view of the filtering module of the air filtering system according to the preferred embodiment of the present invention.

Specifically, as shown in FIG. 4 to FIG. 6 of the drawings, the filtering module 1 may further comprise a housing 11 for receiving the secondary filtering core 12, and a connection structure 13. Preferably, the diameter of the upper casing portion 212 of the outer casing 21 may match with a diameter of the housing 11. The housing 11 may be detachably and coaxially coupled at the upper casing portion 212 of the outer casing 21 in an edge-to-edge manner.

The housing 11 may have a receiving cavity 112 communicating with the air inlet 20 and the air outlet 30 when the filtering module 1 is coupled between the main body 2 and the air flow cover 3. The secondary filtering core 12 may be replaceably disposed in the receiving cavity 112 of the housing 11. The receiving cavity 112 may be coaxially and directly communicated between the air inlet 20 and the air outlet 30, or may be connected through any air duct, depending on the structural configuration of the air filtering system 100 and the structural configuration of the filtering module 1.

The connection structure 13 may be provided at the housing 11 to detachably connect with the air flow cover 3, to detachably connect with another filtering module 1, and/or to detachably connect with the main body 2. In other words, the main body 2 may be detachably coupled to the air flow cover 3 via the connection structure 13. The filtering module 1 may be detachably coupled at the air flow cover 3 via the connection structure 13. The filtering module 1 may be detachably coupled at the main body 2 via the connection structure 13. The filtering module 1 may be detachably coupled at another filtering module 1 via the connection structure 13. Therefore, two or more filtering modules 1 may be stacked and coupled between the main body 2 and the air flow cover 3 via the connection structures 13. As a result, different combinations among the main body 2, the air flow cover 3, and one or more filtering modules 1 may be formed.

As shown in FIG. 6 of the drawings, the housing 11, which may have a cylindrical shape, may have a first edge rim 116 detachably coupled at the main body 2 and an opposed second edge rim 117 detachably coupled at the air flow cover 1 to support the secondary filtering core 12 between the primary filtering core 22 and the air outlet 30, wherein the first edge rim 116 may be located close to the air inlet 20 and the second edge rim 117 may be located close to the air outlet 30 when the filtering module 1 is coupled between the main body 2 and the air flow cover 3.

The connection structure 13 may comprises a first connector 131 and a second connector 25. The first connector 131 may be provided at the first edge rim 116 of the housing 11, and the second connector 25 may be provided at the main body 2, wherein the first connector 131 and the second connector 132 may be detachably and rotatably coupled with each other to detachably couple the housing 11 at the main body 2. The first connector 131 and the second connector 132 may be configured as snap fasteners integrally formed at the first edge rim 116 of the housing 11 and the main body 2 respectively, such that the housing 11 may be rotatably coupled at the main body 2 via the rotatable snap connection of the first connector 131 and the second connector 132. The connection structure 13 may further comprise a third connector 132 provided at the second edge rim 117 of the housing 11 and a fourth connector 31 provided at the air flow cover 3, wherein the third connector 132 and the fourth connector 31 may be detachably and rotatably coupled with each other to detachably couple the housing 11 at the air flow cover 3. Likewise, the third connector 132 and the fourth connector 31 may be configured as snap fasteners integrally formed at the second edge rim 117 of the housing 11 and the air flow cover 3 respectively, such that the housing 11 may be rotatably coupled at the air flow cover 3 via the rotatable snap connection of the third connector 132 and the fourth connector 31.

In this preferred embodiment, the filtering module 1 may be rotatably coupled by snap connection. In other words, when the filtering module 1 is rotated at one direction, the filtering module 1 may be coupled to the main body 2 and the air flow cover 3. When the filtering module 1 is rotated at an opposite direction, the filtering module 1 may detach from the main body 2 and the air flow cover 3. Hence, at the basic air filtering mode, the second connector 25 and the fourth connector 31 may be detachably and rotatably coupled with each other to detachably couple the air flow cover 3 at the main body 2. At the advanced air filtering mode, the first connector 131 and the second connector 25 may be detachably and rotatably coupled with each other to detachably couple the housing 11 at the main body 2 while the third connector 132 and the fourth connector 31 may be detachably and rotatably coupled with each other to detachably couple the housing 11 at the air flow cover 3. The first connector 131 and the fourth connector 31 may be structurally identical while the second connector 25 and the third connector 132 may be structurally identical. Therefore, the assembling and disassembling operation of the filtering module 1 is easy and simple, so as to simplify the structural configuration of the air filtering system 100 while being cost effective.

Figure 3:
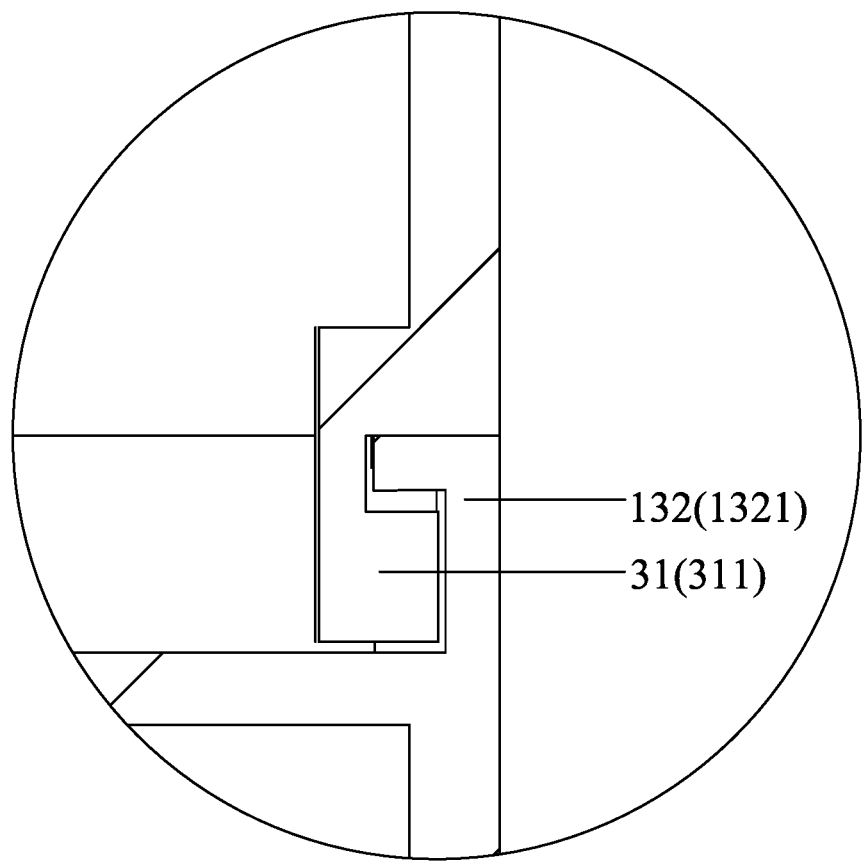
FIG. 3 is a partially enlarged view of section A in FIG. 2 illustrating an engagement of the air filtering system according to above preferred embodiment of the present invention.

As shown in FIG. 2 and FIG. 3 of the drawings, the first connector 131 may comprise a plurality of first engaging hooks 1311 spacedly formed at the first edge rim 116 of the housing 11 along a circumferential surface thereof. The second connector 25 may have a plurality of first engaging slots 251 spacedly formed at the main body 2 along a circumferential surface thereof. Accordingly, the first engaging hook 1311 and the first engaging slot 251 may form a snap connection that the first engaging hooks 1331 may detachably engage with the first engaging slots 251 respectively. The third connector 132 may have a plurality of second engaging slots 1321 spacedly formed at the second edge rim 117 of the housing 11 along a circumferential surface thereof. The fourth connector 31 may have a plurality of second engaging hooks 311 spacedly formed at the air flow cover 3 along a circumferential surface thereof. Accordingly, the second engaging hook 311 and the second engaging slot 1321 may form the snap connection that the second engaging hooks 311 may detachably engage with the second engaging slots 1321 respectively. It is worth mentioning that the first engaging slots 251 and the second engaging hooks 311 may detachably engage with each other to detachably couple the air flow cover 3 at the main body 2 at the basic air filtering mode.

As shown in FIG. 6 of the drawings, the third connector 132 may further have an indention slot 1320 provided at the second edge rim 117 of the housing 11, a slot opening 1322 formed at a top side of the indention slot 1320, and a slot locker 1323 formed at the slot opening 1322, wherein the second engaging hook 311 may extend to the indention slot 1320 through the slot opening 1322 and may be locked at the slot locker 1323 in order to engage the second engaging hook 311 with the third connector 132 during the installation.

The filtering module 1 may be provided such that the housing 11 may further have a first air passage 111 and a second air passage 113. The first air passage 111 may communicate with the air inlet 20. The second air passage 113 may communicate with the air outlet 30. The receiving cavity 112 may communicate between the first air passage 111 and the second air passage 113. During the operation, air may be guided to enter into the outer casing 21 from the air inlet 20. After that, the air may first be filtered by the primary filtering core 20, the filtered air may then be guided to enter into the receiving cavity 112 through the first air passage 111. Then, the filtered air may be filtered again by the secondary filtering core 12. Eventually, the air which has been filtered twice may be guided to pass through the second air passage 113 to the air outlet 30 so as to complete the filtering operation of the air filtering system 100.

As shown in FIG. 5 of the drawings, the filtering module 1 may be provided that the first air passage 111 and the receiving cavity 112 may have an annular shape, and the second air passage 113 may have a circular shape. The first air passage 111, the receiving cavity 112 and the second air passage 113 may be coaxially aligned with each other and are sequentially provided at the housing 11 from the outside to the inside thereof. In other words, the first air passage 111 may be provided at an outer circumferential portion of the housing 11, while the second air passage 113 may be provided at a center portion of the housing 11, and the receiving cavity 112 may be provided between the first air passage 111 and the second air passage 113. It should be appreciated that the above arrangement can be modified according to the actual or specific circumstances in which the present invention is utilized or manufactured. The first air passage 111, the receiving cavity 112, and the second air passage 113 may be formed in square shape, oval shape, or other shapes. In addition, the first air passage 111, the filtering module 1 and the second air passage 113 can also be arranged orderly from the inside to the outside of the housing 11, from top to bottom of the housing 11, or from bottom to top of the housing 11, which should not be limited in the present invention.

As shown in FIG. 5 and FIG. 6 of the drawings, the filtering module 1 may be provided that the first air passage 111 may extend from the first edge rim 116 of the housing 11 toward the second edge rim 117 thereof. The receiving cavity 112 and the second air passage 113 may extend from the second edge rim 117 of the housing 11 toward the first edge rim 116 thereof. The housing 11 may further comprise a first partition wall 114 provided between the first air passage 111 and the receiving cavity 112, and a second partition wall 115 provided between the second air passage 113 and the receiving cavity 112. Specifically, the first partition wall 114 may have a first base portion 1141 and a first extension portion 1142 upwardly extended from the first base portion 1141 to form a cylindrical structure. Similarly, the second partition wall 115 may have a second base portion 1151 and a second extension portion 1152 extended from the second base portion 1151 to form a cylindrical structure. The first partition wall 114 and the second partition wall 115 may be coaxially aligned with each other.

The housing 11 may further have a first vent hole 1140 formed at the first partition wall 114 and a second vent hole 1150 formed at the second partition wall 115. Preferably, a plurality of first vent holes 1140 may spacedly be distributed on the first partition wall 114 to communicate between the first air passage 111 and the receiving cavity 112, and a plurality of second vent holes 1150 may spacedly be distributed on the second partition wall 115 to communicate between the second air passage 113 and the receiving cavity 112. According to the first preferred embodiment of the present invention, a first opening 1110 of the first air passage 111 may be located at the first edge rim 116 of the housing 11. A second opening 1120 of the receiving cavity 112 and a third opening 1130 of the second air passage 113 may be located at the second edge rim 117 of the housing 11. The second opening 1120 of the receiving cavity 112 may be covered by a cavity cover 14. Therefore, during the operation of the filtering module 1, as shown in FIG. 3 of the drawings, air may be guided to enter from the air inlet 20 to the first air passage 111 through the first opening 1110 thereof. The air may then be guided to flow into the receiving cavity 112 through the first vent hole 1140. After the air is filtered by the secondary filtering core 12 in the receiving cavity 112, the filtered air may be guided to flow to the second air passage 113 through the second vent hole 1150. Then, the filtered air may be guided to flow to the air outlet 30 through the third opening 1130 of the second air passage 113.

Figure 7:
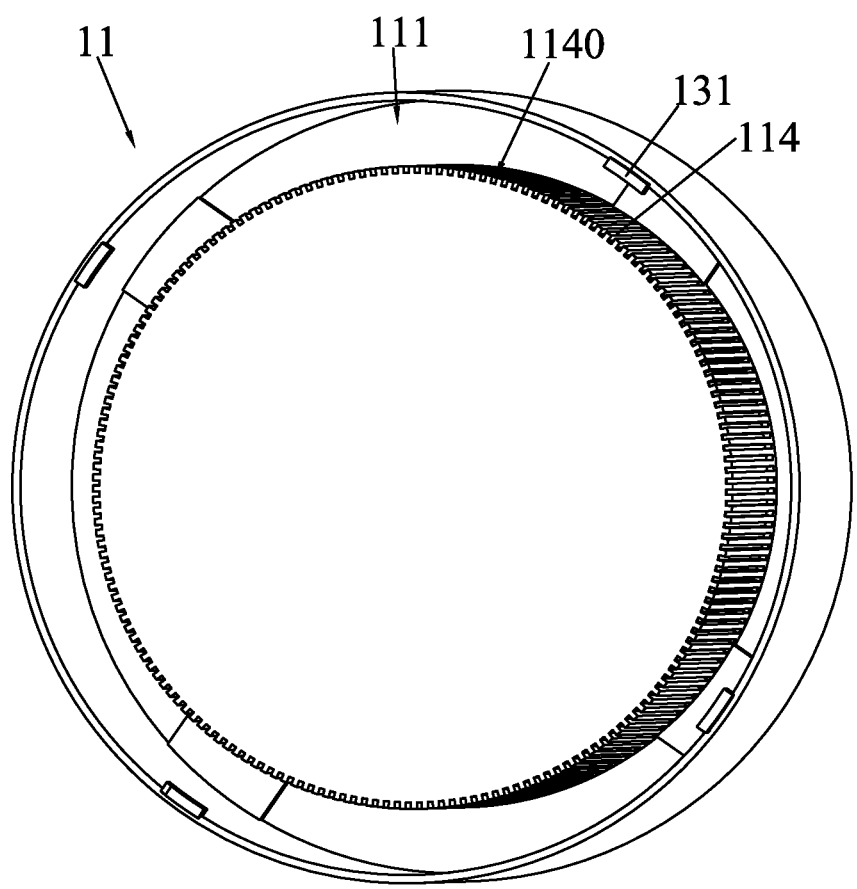
FIG. 7 is a top view of a housing of the air filtering system according to the preferred embodiment of the present invention.

As shown in FIG. 6 and FIG. 7 of the drawings, the filtering module 1 may be provided that the first vent holes 1140 may be evenly and circumferentially distributed at the first partition wall 114, such that the air is guided to radially and inwardly flow from the first air passage 111 to the receiving cavity 112 through the first vent holes 1140. Likewise, the second vent holes 1150 may be evenly and circumferentially distributed at the second partition wall 115, such that the air is guided to radially and inwardly flow from the receiving cavity 112 to the second air passage 113 through the second vent holes 1150. Therefore, air may be guided to smoothly flow from the first air passage 111 to the receiving cavity 112 and from the receiving cavity 112 to the second air passage 113, so as to improve the air flow and the working efficiency of the filtering module 1.

As shown in FIG. 6 of the drawings, the filtering module 1 may be provided that the housing 11 may further have a third air passage 119 which has a circular shape. The third air passage 119 may extend from a center portion of the first edge rim 116 of the housing 11 toward the second edge rim 117 thereof. The third air passage 119 may also communicate with the first air passage 111. Particularly, the third air passage 119 may be defined within the first edge rim 116 and a bottom wall of the receiving cavity 112, such that the third air passage 119 may only communicate with the first air passage 111. As shown in FIG. 2 of the drawings, when two filtering modules 1 are stacked and connected with each other by connecting the first edge rim 116 of the housing 11 of the first filtering module 1 with the second edge rim 117 of the housing 11 of the second filtering module 1, the third opening 1130 of the second air passage 113 of the second filtering module 1 may be located at a center position that the third air passage 119 is arranged to communicate with the third opening 1130 with the second air passage 113. In other words, the third air passage 119 may be arranged to communicate between two filtering modules 1 when the filtering modules 1 are connected with each other. For example, when the first filtering module 1 is stacked on top of the second filtering module 1, and after the air is filtered by the secondary filtering core 12 at the receiving cavity 112 of the second filtering module 1 to the second air passage 113 thereof, the filtered air may be guided to pass from the second air passage 113 of the second filtering module 1 to the third air passage 119 of the first filtering module 1, such that filtered air may be guided to flow to the first air passage 111 of the first filtering module 1 from the third air passage 119 thereof for being further filtered by the secondary filtering core 12 at the first filtering module 1.

The present invention, while illustrated and described in terms of a preferred embodiment and several alternatives, is not limited to the particular description contained in this specification. Additional alternative or equivalent components could also be used to practice the present invention.

What is claimed is:

1. An air filtering system, comprising:

a main system which comprises a main body having an air inlet, an air flow cover having an air outlet, and a primary filtering core replaceably disposed in said main body, wherein said air flow cover is detachably coupled at said main body to form a basic air filtering mode for filtering air from said air inlet to said air outlet through said primary filtering core;

at least a filtering module detachably coupled between said main body and said air flow cover to form an advanced air filtering mode, said filtering module comprising:

a secondary filtering core arranged for filtering the air after passing through said primary filtering core and before exiting said air outlet, so that intake air is arranged to sequentially pass through said primary filtering core and said secondary filtering core and is filtered at least twice before exiting said air outlet; and a housing to receive said second filtering core therein, said housing having a first edge rim detachably coupled at said main body, and an opposed second edge rim detachably coupled at said air flow cover to support said secondary filtering core between said primary filtering core and said air outlet; and a connection structure, which comprises:

a first connector provided at said first edge rim of said housing;

a second connector provided at said main body;

a third connector provided at said second edge rim of said housing; and a fourth connector provided at said air flow cover, wherein at said basic air filtering mode, said second connector and said fourth connector are detachably and rotatably coupled with each other to detachably couple said air flow cover at said main body, wherein at said advanced air filtering mode, said first connector and said second connector are detachably and rotatably coupled with each other to detachably couple said housing at said main body while said third connector and said fourth connector are detachably and rotatably coupled with each other to detachably couple said housing at said air flow cover, said first connector comprising a plurality of first engaging hooks spacedly formed at said first edge rim of said housing along a circumferential surface thereof, said second connector having a plurality of first engaging slots spacedly formed at said main body along a circumferential surface thereof, wherein said first engaging hook and the first engaging slot are detachably engaged with each other, said third connector having a plurality of second engaging slots spacedly formed at said second edge rim of said housing along a circumferential surface thereof, said fourth connector having a plurality of second engaging hooks spacedly formed at said air flow cover along a circumferential surface thereof, wherein said second engaging hook and the second engaging slot are detachably engaged with each other.

2. The air filtering system, as recited in claim 1, wherein said third connector further has an indention slot provided at said second edge rim of said housing, a slot opening formed at a top side of said indention slot, and a slot locker formed at said slot opening, wherein said second engaging hook is extended to said indention slot through said slot opening and is locked at said slot locker in order to engage said second engaging hook with said third connector.

3. The air filtering system, as recited in claim 2, wherein said housing comprises a first air passage communicating with said air inlet, a receiving cavity for receiving said secondary filtering core therein, and a second air passage communicating with said air outlet, such that the air is guided to flow from said first air passage to said second air passage through said receiving cavity for being filtered by said secondary filtering core.

4. The air filtering system, as recited in claim 3, wherein said housing further comprises a first partition wall provided between said first air passage and said receiving cavity, a second partition wall provided between said receiving cavity and said second air passage, a plurality of first vent holes spacedly formed at said first partition wall for communicating between said first air passage and said receiving cavity, and a plurality of second vent holes spacedly formed at said second partition wall for communicating between said receiving cavity and said second air passage.

5. The air filtering system, as recited in claim 4, wherein each of said first partition wall and said second partition wall has a hollow shape that said first partition wall and said second partition wall are coaxially aligned with each other.

6. The air filtering system, as recited in claim 3, wherein said first air passage, said receiving cavity, and said second air passage are coaxially aligned with each other that said first air passage is provided at an outer circumferential portion of said housing, said second air passage is provided at a center portion of said housing, and said receiving cavity is provided between said first air passage and said second air passage.

7. The air filtering system, as recited in claim 4, wherein said first air passage, said receiving cavity, and said second air passage are coaxially aligned with each other that said first air passage is provided at an outer circumferential portion of said housing, said second air passage is provided at a center portion of said housing, and said receiving cavity is provided between said first air passage and said second air passage.

8. The air filtering system, as recited in claim 3, wherein an opening of said first air passage is located at said first edge rim of said housing, an opening of said receiving cavity and an opening of said second air passage are located at said second edge rim of said housing, wherein said second opening of said receiving cavity is covered.

9. The air filtering system, as recited in claim 7, wherein an opening of said first air passage is located at said first edge rim of said housing, an opening of said receiving cavity and an opening of said second air passage are located at said second edge rim of said housing, wherein said second opening of said receiving cavity is covered.

10. The air filtering system, as recited in claim 3, wherein said housing further has a third air passage formed within said first edge rim of said housing and a bottom wall of said receiving cavity, wherein said third air passage is communicated with said first air passage, wherein when two of said filtering modules are stacked and connected with each other, said second air passage of one of said filtering modules is communicated with said third air passage of another said filtering module, such that said third air passage is arranged to communicate between two of said filtering modules.

11. The air filtering system, as recited in claim 9, wherein said housing further has a third air passage formed within said first edge rim of said housing and a bottom wall of said receiving cavity, wherein said third air passage is communicated with said first air passage, wherein when two of said filtering modules are stacked and connected with each other, said second air passage of one of said filtering modules is communicated with said third air passage of another said filtering module, such that said third air passage is arranged to communicate between two of said filtering modules.

12. The air filtering system, as recited in claim 1, wherein said main body comprises an outer casing defining said air inlet defining at a bottom thereof, a motor received in said outer casing, and a fan impeller being powered by said motor, wherein said primary filtering core, said motor, and said fan impeller are sequentially arranged from bottom to top of said outer casing.

13. The air filtering system, as recited in claim 12, wherein said outer casing has a bottom casing portion receiving said primary filtering core therein, and an upper casing portion receiving said motor and said fan impeller therein, wherein a diameter of said upper casing portion of said outer casing matches with a diameter of said housing, such that said housing is detachably and coaxially coupled at said upper casing portion of said outer casing edge-to-edge.

14. The air filtering system, as recited in claim 13, wherein a diameter of said bottom casing portion of said outer casing is larger than the diameter of said upper casing portion thereof.

15. The air filtering system, as recited in claim 1, wherein said primary filtering core and said secondary filtering core have different filtering functions.

16. The air filtering system, as recited in claim 1, wherein said secondary filtering core is an activated carbon filter.

17. The air filtering system, as recited in claim 1, wherein said secondary filtering core is a humidified air filter.

* * * * *